R. P. BARRY & J. W. MURPHY.
SAFETY STOP DEVICE.
APPLICATION FILED SEPT. 16, 1911.
1,039,687.
Patented Oct. 1, 1912.
2 SHEETS—SHEET 1.
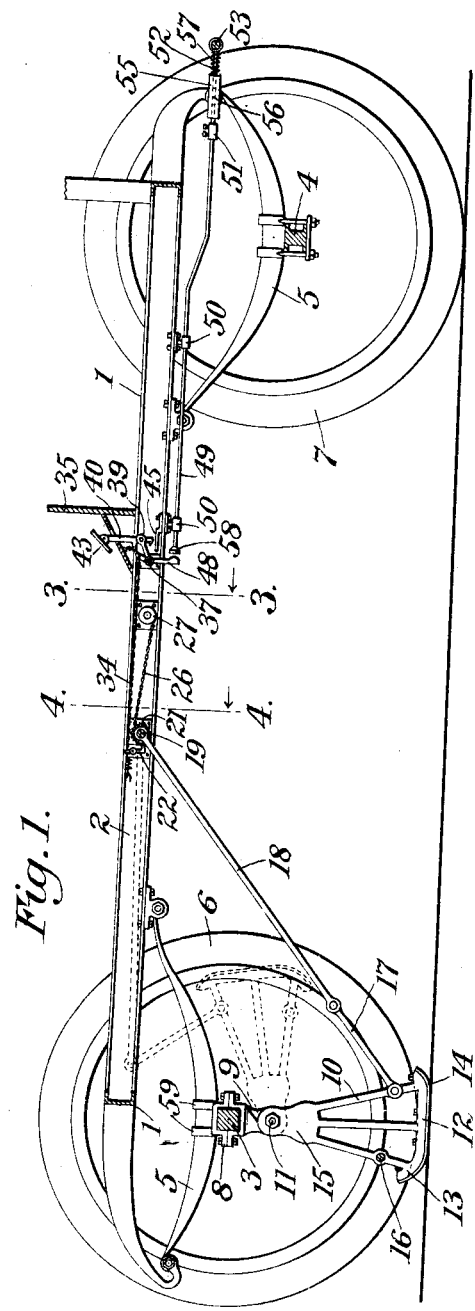
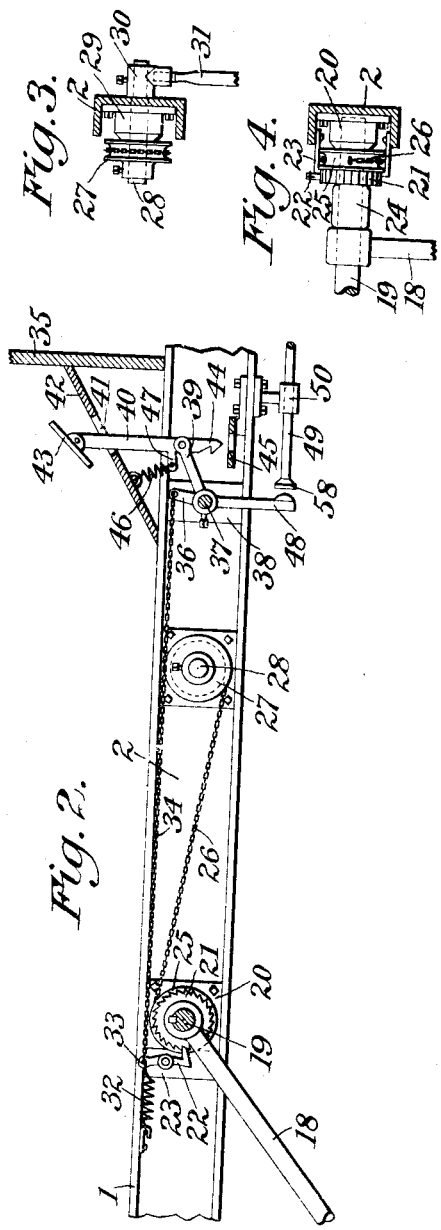
Witnesses:
A. N. Jesbera
E. A. Kline
Inventors:
Richard P. Barry
John W. Murphy
By their Attorney,
Francis D. Ammen

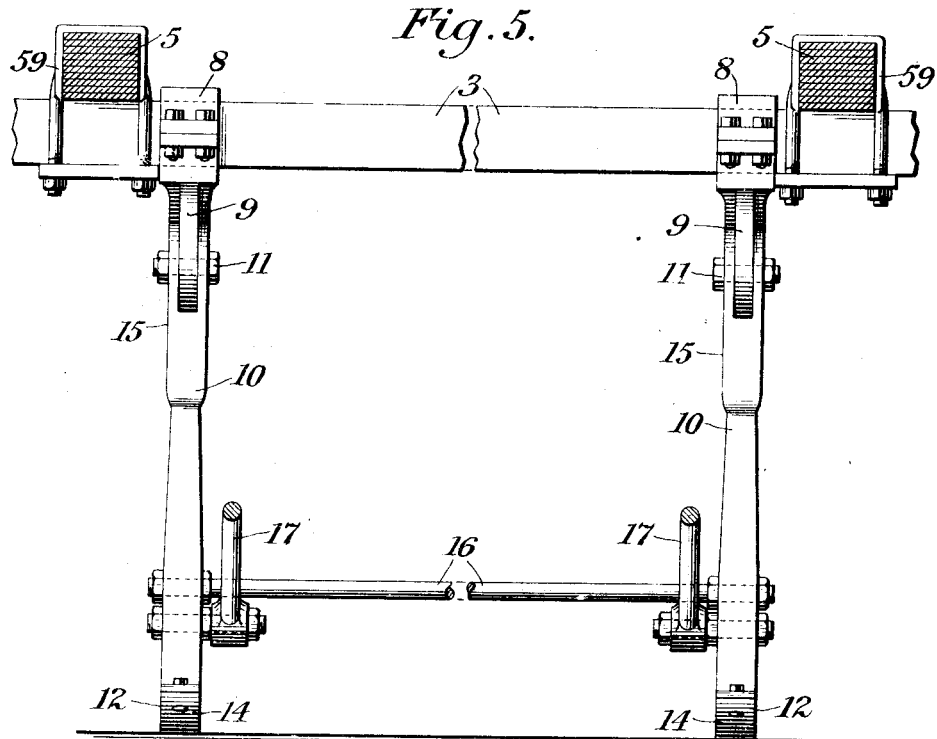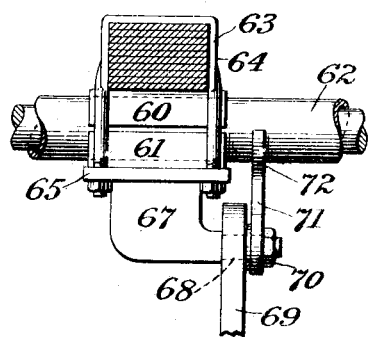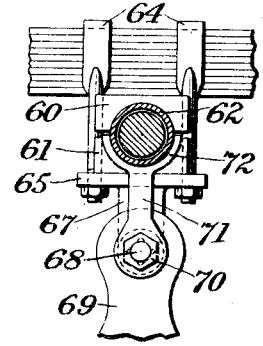

UNITED STATES PATENT OFFICE.

RICHARD P. BARRY AND JOHN W. MURPHY, OF BROOKLYN, NEW YORK.

SAFETY STOP DEVICE.

1,039,687.   Specification of Letters Patent.   Patented Oct. 1, 1912.

Application filed September 16, 1911. Serial No. 649,766.

*To all whom it may concern:*

Be it known that we, RICHARD P. BARRY and JOHN W. MURPHY, citizens of the United States, residing at Brooklyn, in the county of Kings, State of New York, have invented new and useful Improvements in Safety Stop Devices, of which the following is a specification.

This invention relates to automobiles and similar vehicles and the principal object of the invention is to produce a safety stop device which will enable the vehicle to be stopped instantly at the will of the chauffeur, to prevent collisions, and to prevent skidding.

A further object of the invention is to render the mechanism automatically operative through the medium of the bumper at the forward end of the car or vehicle.

In carrying out the invention, shoes or similar devices attached to the car are normally held in a raised or inoperative position arranged to be brought to the ground so as to raise the rear or driving wheels of the vehicle off of the ground. This instantly arrests the propelling action of the wheels, and stops the car also by reason of the absorption of energy due to the lifting of the weight of the car.

While the device is intended primarily for an emergency stopping device, it is also useful to perform the function of a jack to raise the rear axle when on the road to permit the repair of a wheel or tire. The device may also be used to arrest a car which may be running away on a down grade, and the mechanism therefore gives a very complete control of the car.

The invention consists in the construction and combination of parts to be more fully described hereafter and particularly set forth in the claims.

In the drawing which fully illustrates the invention Figure 1 is a longitudinal vertical section through the frame of an automobile to which the invention is applied. Fig. 2 is a view similar to Fig. 1, but showing only a portion of the mechanism upon an enlarged scale. Fig. 3 is a vertical section taken on the line 3—3 of Fig. 1, but upon the same scale as Fig. 2. Fig. 4 is a vertical section on the line 4—4 of Fig. 1, and this view is also upon the same scale as Fig. 2. Fig. 5 is a view looking from the front to the rear between the rear wheels of the automobile and showing the means for mounting the safety shoes on a square axle. Fig. 6 is a vertical section taken just forward of the axle showing means for securing the shoes to a round axle or axle case. Fig. 7 further illustrates the parts shown in Fig. 6, the axle being shown in cross section.

The frame 1 of the automobile or other vehicle comprises two side bars 2 which may be of the usual channel form, said frame being supported on the rear axle 3 and forward axle 4 by means of the usual springs 5. The vehicle is provided with the rear wheels 6 and forward wheels 7 mounted in any suitable manner on the axles.

To the rear axle 3 we attach a pair of clamps 8, the lower portions of which are formed into hanger 9, to which the safety shoes 10 are pivotally secured by suitable pivot bolts 11. These shoes have runners or feet 12 which are adapted to come upon the ground as illustrated in Fig. 1, and these runners are preferably formed with upwardly extending toes 13 at their rear ends. The under face of each runner is provided with a wearing strip 14 of steel or any suitable material. The shoes have three radial arms which connect the runner 12 with the hub 15, and near the rear ends of the runners 12 the shoes are connected by a transverse tie bar 16. In order to hold the shoes normally raised in the position indicated in the dotted lines in Fig. 1, the shoes have links 17 attached to their forward sides and these links are attached to arms 18 which are rigidly attached to a cross shaft 19 extending between the side bars 2 of the frame. The ends of this cross shaft are suitably mounted in bearings 20 mounted on the inner sides of the side bars 2 as indicated in Fig. 4, but the extremities of this shaft do not extend through the side bars 2.

Rigidly mounted on the cross shaft 19 preferably at one side of the frame, there is provided a ratchet wheel 21 with which coöperates a pawl 22 pivotally mounted on a suitable bracket 23. When this pawl is in engagement with the ratchet wheel it will evidently prevent a rotation of the cross shaft and will therefore normally operate to hold the arm 18 in the elevated position shown in the dotted lines. As illustrated in Fig. 4, between the ratchet wheel and the extremity of the arm 18 a distance collar 24 is provided. Rigid with the ratchet wheel 21 there is provided a small chain wheel or drum 25 and around this wheel passes a lifting chain 26 which passes forwardly from the upper face of the wheel and thence around a chain wheel or drum 27 which is rigidly secured to a stub shaft 28 or pin of small diameter which is rotatedly mounted in a bearing 29 on the side bar 2 of the frame. In order to enable this chain wheel 27 to be rotated to lift the shoes, the pin or stub shaft 28 is provided with a rigid socket 30 in which a removable lever or crank 31 may be attached. The pawl 22 is normally held seated between the teeth of the ratchet wheel 21 by means of a spring 32 which is attached to an arm 33 extending upwardly from the pawl.

In order to enable the safety shoes to be released instantly at the will of the chauffeur, we provide a releasing chain 34 which is attached to the arm 33 and extends forwardly to a point near the dash 35, and the forward end of this chain attaches to an arm 36 rigid on a rock shaft 37, the ends of said rock shaft being mounted in suitable bearings 38 arranged on the inner sides of the side bars 2. This rock shaft 37 is further provided with a forwardly projecting arm 39 which is pivotally connected with a stem 40 passing downwardly through an opening 41 in an inclined foot rest 42, and carrying a pivoted foot plate 43 as shown. The lower end of this stem 40 is formed into a catch or hook 44 which cooperates with a hook plate 45 so as to lock the stem in a depressed position and maintain the pawl out of engagement with the teeth when the shoes have been released. This action of the catch 44 is brought about by means of a spring 46 which is attached to the under side of inclined rest 42 and is attached to a lug 47 on the rear side of the stem, said spring being in such a position that it tends to pull the catch 44 rearwardly and so that it will snap into engagement with the hook plate 45. In order to enable the pawl to be released automatically in case the vehicle encounters an obstruction, as in a collision, we provide rock shaft 37 with downwardly extending arms 48, the lower ends of which are in line with the rear extremities of two stems 49 mounted to slide rearwardly in suitable guides or brackets 50. These stems 49 are offset downwardly toward the front, and are attached by couplings 51 to the rear extremities of plungers 52 attached to bumper 53, and sliding rearwardly through guides 54 which are pivoted on the bolts 56 which connect the forward springs 5 to the forward end of the frame. Around the plungers 52, springs 57 are provided which permit a rearward movement of the bumper 55 and return it after a bump. The rear ends of the stems 49 are formed with heads 58, which, when the bumper is struck, force the arms 48 rearwardly and rock the shaft 37 so as to release the pawl.

Referring again to the shoes and the means for supporting the same from the axle as shown in Fig. 5, when the rear axle is square, we simply employ the clamps 8 and attach them to the axle near the clips 59, which secure the springs 5 to the axle. When the axle is of round form, or surrounded by a tubular case we provide the construction shown in Figs. 6 and 7. In this instance we provide clamping blocks 60 and 61 which respectively clamp the upper and lower sides of the axle case 62 and these blocks are clamped on the axle case by U bolts 63, thus forming fastening clips 64. The lower ends of the U bolts are provided with cap plates 65 which are forced upwardly by clamping nuts at the ends of the U bolts. The cap plate 65 forms the upper extremity of a bracket or hanger 67 which has a lateral extension or horizontal stud 68 upon which the shoe 69 is secured by means of a suitable nut 70. In order to additionally secure the stud 68 we provide a brace 71 which is clamped on the stud 68 by the nut 70 and this brace is in the form of a plate which extends upwardly and terminates in a yoke 72 which seats against the under side of the axle case as shown.

The mode of operation of the device will now be described.

The shoes 10 are normally held in their raised inoperative position as indicated in the dotted lines in Fig. 1, and they are held raised in this manner by the pawl 22 engaging with the ratchet wheel 21 which is rigid with the cross shaft 19. At the will of the chauffeur the foot plate 43 may be depressed, and this will force the stem 40 downwardly, and through the medium of the frame 39, will actuate the rock shaft 37 and the frame 36 so that the releasing chain 34 will be pulled. This releases the pawl from the ratchet wheel, and the shoes then fall by their own weight to the position in which they are shown in full lines. In this position the link 17 is in longitudinal alinement with the arm 18. As the shoes come upon the ground the rear toes 13 strike the ground first and the forward momentum or inertia of the vehicle simply rocks the shoes forwardly and raises the axle so as to bring the rear wheels off the ground as illustrated. If desired the stem 40 can be sufficiently depressed by the foot, to enable the catch 44 to engage with the hook plate 45 and lock the pawl in its released position. The pawl will be automatically released if the bumper bar 53 is struck, for as the bar is forced rearwardly the rear ends of the stems 49 will strike the arms 48 and actuate the rock shaft 37 in the same manner as the foot plate 43 may actuate it. Attention is called to the guide opening 41 through which the stem 40 passes downwardly and to the fact that this guide opening is in the form of an elongated slot, which permits a liberal amount of play, or front and rear movement of the upper end of the stem. This is necessary in order to facilitate the latching and unlatching of the catch 40. By pulling the foot plate 43 rearwardly the catch 44 can be released and the spring 32 will then return the pawl 22 and the rock shaft 37 to their normal positions. The shoes may then be raised by applying the crank or lever 31 to the socket 30 and rotating the lifting chain wheel or drum 25. In this connection attention is called to the fact that if the catch 44 is not first released the shoes cannot be held up, although the lifting chain drum 27 has been rotated, because the pawl will be held out of engagement with its ratchet wheel. For this reason, the device constitutes means for preventing a car from being used by a person who does not understand its mechanism for if the car is left standing the shoes can be released and the car cannot then be operated until the shoes are raised; and a person not familiar with the mechanism of the car would not understand how to lock the shoes raised even if he discovered how to raise them.

In using the device to perform the functions of a jack to raise the rear wheels off the ground, the car would be advanced at a low speed and the shoes would then be released. This would bring the car to a stop with the shoes on the ground and raise the rear wheels clear of the ground. By means of the crank 31 the shoes can be raised and the rear end of the frame permitted to come down easily to let the wheels rest again on the earth.

The device is also useful to prevent skidding of the rear wheels. In this connection it will prevent accidents and arrest the dangerous swinging movement of the rear part of the vehicle which often takes place when skidding occurs. When used to perform the function of a jack, attention is called to the fact that the device raises both wheels; in this way it is more effective than an ordinary jack as usually applied under one end of the axle which tends to twist the frame and other parts out of their proper alinement.

What we claim and desire to secure by Letters Patent is:

1. A vehicle having a frame, an axle, and wheels on said axle, brake shoes pivotally connected to said axle and adapted to descend to the ground, a pair of arms pivotally mounted on said frame and connected with said brake shoes, a ratchet wheel rigid with said arms on the pivotal axis thereof, a pawl coöperating with said ratchet wheel to hold said shoes normally raised, and means for releasing said pawl to permit said shoes to descend.

2. A vehicle having a frame, an axle, and wheels carried by said axle, a pair of brake shoes adapted to descend to the ground, holding means for normally holding said brake shoes elevated, a foot-plate adapted to move forward to release said brake-shoes to permit their descent, locking means for holding said foot-plate against return, arranged to release said foot-plate by a backward movement of said plate, bumpers at the forward end of said frame, a lever carrying said foot-plate, and for actuating said holding means, and means for actuating said lever by said bumpers.

3. A vehicle having a frame, an axle, and wheels on said axle, brake-shoes adapted to descend to engage the ground, means for normally holding the same raised, a foot-plate having a pivoted stem, a member actuated by a forward movement thereof to release said shoes, bumpers adapted to actuate said member to release said shoes, and means for locking said stem against return after being actuated, said stem being arranged to release from said last means by a rearward movement.

4. A vehicle having a frame, an axle and wheels on said axle, brake shoes, a rock-shaft controlling the application of said brake-shoes, an arm rigid with said rock-shaft, a foot plate having a stem pivoted to said rock-shaft, a foot rest, means under said foot rest for locking said stem against return after actuation by said foot plate, said last locking means being arranged to release said stem by a reverse movement of said foot-plate.

5. A vehicle having a frame, an axle, and wheels on said axle, brake-shoes, means for normally holding the same unapplied, a rock-shaft, means actuated thereby for releasing said brake-shoes, a rigid arm on said rock-shaft, a foot plate having a stem pivotally attached to said arm for actuating said rock-shaft, said stem having a hook at the lower end thereof, a hook plate for engaging said hook to lock the said foot plate against return when depressed, and means tending to return said foot plate, said stem being arranged to release from said hook-plate by a reverse movement of said hook-plate.

6. A vehicle having a frame, brake-shoes movably supported by said frame, a rock-shaft, means actuated thereby for controlling said brake-shoes, a rigid arm on said rock-shaft, a foot plate having a stem pivoted on said arm, a fixed hook-plate, said stem having a catch formed thereupon adapted to move toward and engage said foot plate when said stem is depressed by a forward movement of said hook-plate to rock said rock-shaft, a spring tending to return said foot-plate and stem when depressed, bumpers at the forward end of said frame, and rigid arms carried by said rock-shaft and adapted to be actuated by said bumpers.

Signed at Brooklyn in the county of Kings and State of New York this 14 day of September, A. D. 1911.

RICHARD P. BARRY.
JOHN W. MURPHY.

Witnesses:
SAMUEL W. JEFFREY,
LAFFAYETTE J. HAINES.